Feb. 28, 1933.   L. E. FEIGHTNER   1,898,997
RAILWAY VEHICLE TRUCK
Filed May 16, 1929   4 Sheets-Sheet 1

INVENTOR
Lewis E. Feightner
BY
ATTORNEYS

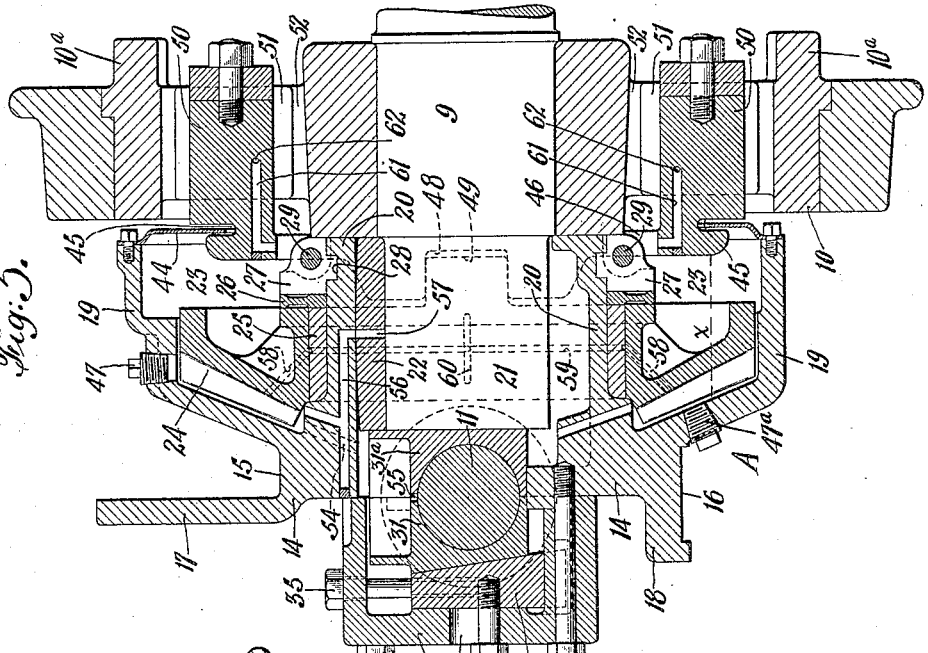

Feb. 28, 1933.  L. E. FEIGHTNER  1,898,997
RAILWAY VEHICLE TRUCK
Filed May 16, 1929  4 Sheets-Sheet 3
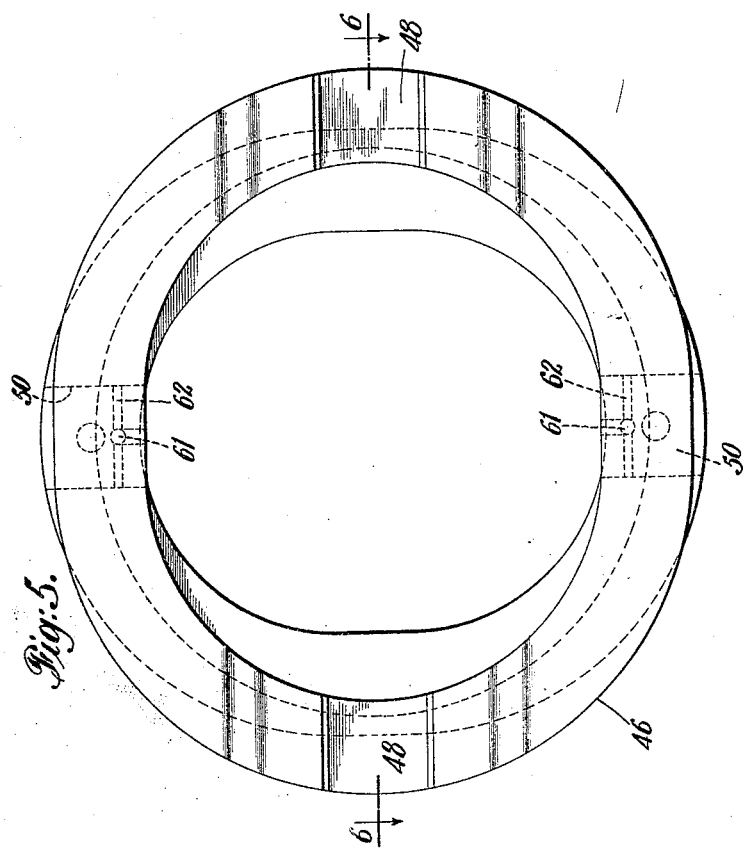
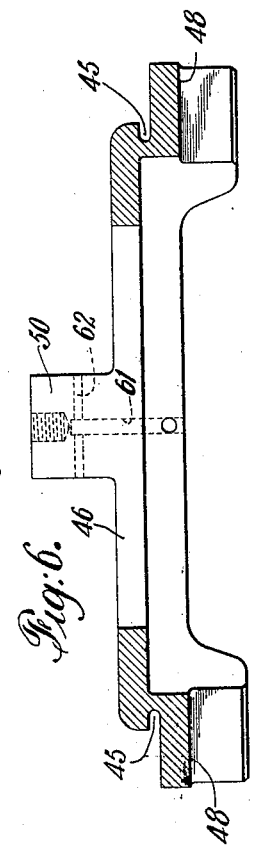
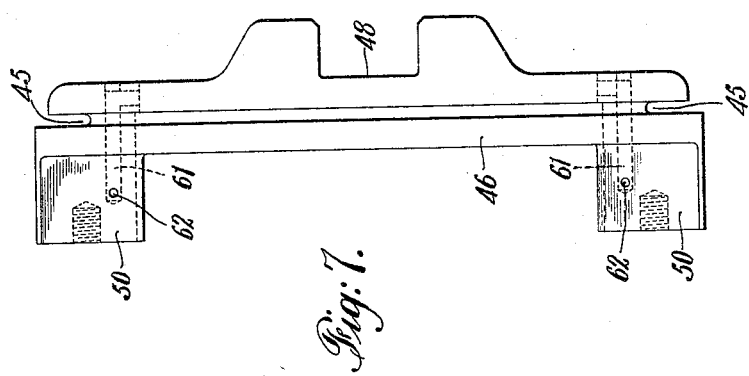
INVENTOR
Lewis E. Feightner
BY
ATTORNEYS

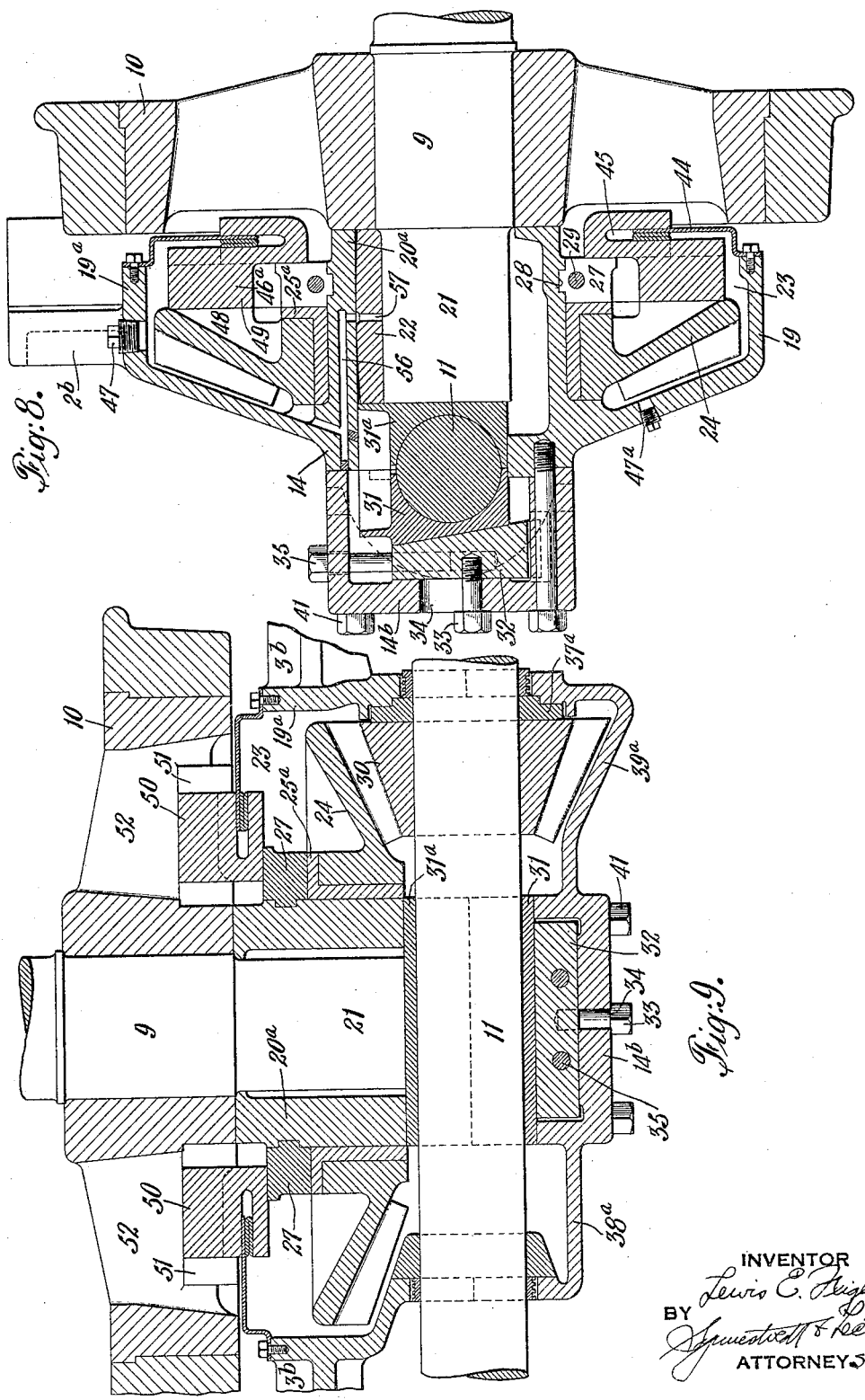

Patented Feb. 28, 1933

1,898,997

UNITED STATES PATENT OFFICE

LEWIS E. FEIGHTNER, OF ELIDA, OHIO

RAILWAY VEHICLE TRUCK

Application filed May 16, 1929. Serial No. 363,613.

This invention relates to railway vehicle trucks, and particularly to geared locomotive truck structures and the driving means thereof. The objects and advantages of the invention will appear most clearly after a brief outline of known constructions and some of the difficulties encountered with them.

In general, geared locomotive trucks, such as employed in Shay or other geared engines, fall into either of two classes, i. e., inside drive and outside drive; the former employing a drive shaft lying between the wheels on one side and the wheels on the other side of the truck, and the latter employing a drive shaft located outside the plane of the wheels on one side of the truck.

In trucks having the inside drive, the shaft usually lies over the axles of the truck and drives them through skew bevel pinions and gears, rigidly secured, respectively, on the shaft and on the axles. This form of construction is subject to disalignment or improper meshing of the gears and pinions whenever the axles are out of parallelism, as occurs on uneven track, and also when wear of the drive shaft bearings and supporting boxes has produced lost motion. Another form of inside drive involves the extension of the drive-shaft over one axle and its connection by gears to the adjacent axle only, the two axles then being connected by side rods. This construction suffers by virtue of the fact that the entire driving power for both axles must be applied through a single pair of gears, and is also subject to the usual disadvantages encountered with side rods and their attendant problems of counterbalancing.

In trucks with outside drive it has been the practice to mount bevel gears rigidly on the wheels, on one side of the truck, and to drive them to bevel pinions rigidly mounted on the drive shaft, which is carried by bearings permanently mounted in the truck frame. With this construction the gears and pinions are properly aligned only when the truck is on perfectly even track; and then only when the truck is new and tight, for as soon as wear begins to take place in the journals or bearings, the wheels with their gears, under pressure of the end thrust resulting from the bevel gear connection, move away from the drive shaft and its pinions, causing a gradual disalignment and even a disengagement of the driving and driven gears.

I aim by my invention to overcome such difficulties and disadvantages, and, in general, to insure proper alignment and operation of the driving gears of such trucks at all times, regardless of track or truck conditions, wear of bearings or journals, or disalignment of axles.

A further object of the invention is to insure quiet operation by the provision of means for positive, automatic lubrication of the gears and other parts of the driving mechanism, as well as of the journal bearings.

Other objects of the invention include the provision of improved bearing means for the drive shaft and means for conveniently taking up wear on the bearings, the simplification of the truck structure and particularly in its relation to the driving gear, and the provision of adequate rocking movement of the journal bearing brasses relative to their boxes.

More particularly, the invention contemplates the provision of a geared truck structure in which a drive-shaft is so arranged as to permit the use of two or more axles in a single truck, each having a geared connection to said shaft, so that the driving load is equally distributed over the entire number of gears and axles, while at the same time, by virtue of a novel arrangement and mounting of the gears and associated parts, all of the gears and pinions are kept in proper mesh and alignment, regardless of journal, wheel or bearing wear, or track or other external conditions.

Specifically, the invention contemplates a driving structure having an outside drive shaft mounted in bearings secured to the truck boxes, the boxes housing and retaining the driven gears in proper mesh with the pinions, which gears in turn drive the axles through the intermediation of a combined universal and slip joint; the whole being arranged to cooperate with the truck to provide a lubricating chamber in which the gears rotate and from which they carry oil and distribute it to the journal bearings and other parts.

How all of the foregoing, together with such other objects and advantages as are incident to the invention, are attained, will be evident from the following description, reference being had to the accompanying drawings, in which:

Figure 3 is an enlarged, detailed, vertical, longitudinal mid-section through one of the driving boxes of said truck, showing the structure of the driving mechanism but omitting the truck frame.

Figure 4 is a horizontal mid-section of the same.

Figure 5 is a front, or outside, elevational view of a member of the driving mechanism, termed the universal driving ring.

Figure 6 is a section taken on the line 6—6 of Fig. 5.

Figure 7 is an elevational view of the driving ring of Fig. 5, taken from the left.

Figure 8 is a view, corresponding to Fig. 3, of a modified construction embodying the invention, and Figure 9 is a horizontal section thereof, corresponding to Fig. 4.

Figure 1:
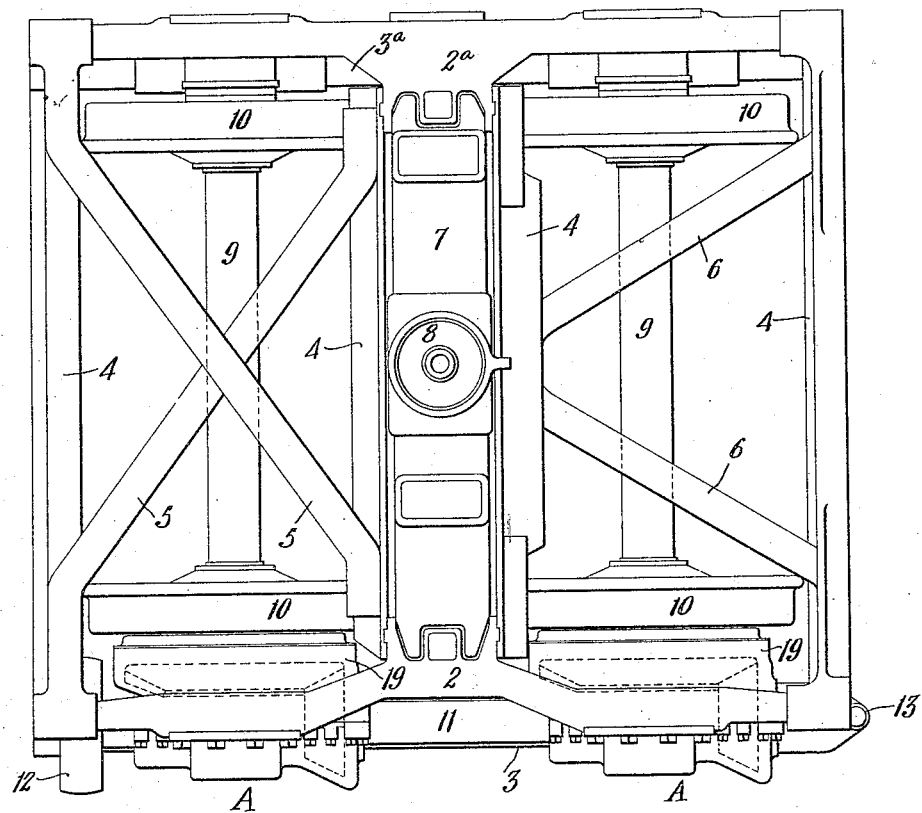
Figure 1 is a plan view of a truck structure equipped with geared driving mechanism embodying the present invention.
Figure 2:
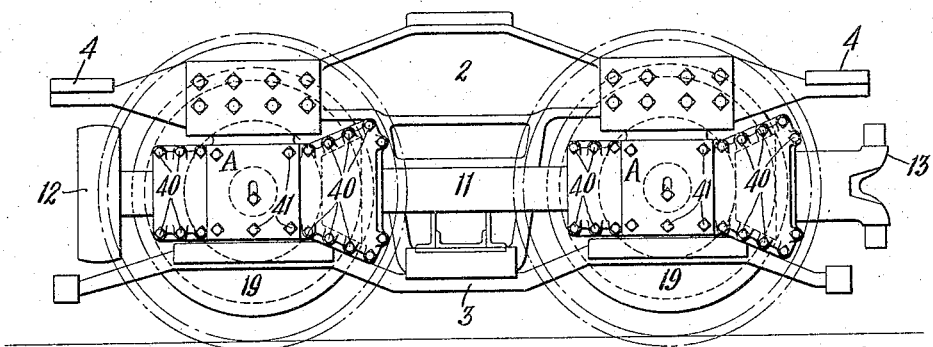
Figure 2 is a side elevation of the same.

By reference first to Figs. 1 and 2, it will appear that I have illustrated a two-axle truck, suitable for geared locomotives, having upper and lower longitudinal frame members 2, 2a, and 3, 3a, respectively; cross-members 4; diagonal braces 5 and 6; bolster 7 and pivot 8; and axles and wheels, 9 and 10. Outside of the wheels is a longitudinally-extending drive-shaft 11, having couplings 12, 13, one for connection to an extension shaft for transmission of power to an adjacent truck, and the other for connection to the power plant of the locomotive. Such a power plant (which need not be shown here) ordinarily comprises a vertically-disposed steam engine mounted on the right hand side of the locomotive, and having a crank-shaft coupled to the drive shaft 11.

By reference now to Figs. 1 to 4, it will be seen that I have provided a unified bearing box and driving gear structure, indicated as a whole by the letter A, at the driving end of each axle, which structure is mounted between the upper and lower truck frame members 2, 3; and, for the purpose of such mounting, the axle-box proper, 14, is provided with recesses 15 and 16 for receiving the frame members, and flanges 17 and 18 for bolting to the frame members. The axle box proper, rearwardly of its said recesses (as seen most clearly in Figs. 1 and 3) is provided with an enlarged annular housing 19 surrounding the inward extension or hub-like portion 20 of the box, in spaced relation thereto. The journal 21 of the axle 9 rides in a bearing 22 having a curved or convexed upper surface in contact with the under surface of the inward box extension 20, so that the axle, with its bearing, is free to rock slightly in the box.

Within the chamber 23, formed by the housing 19 and box extension 20, is located the axle gear 24 which is mounted for rotation on the annular bearing or bushing 25, and retained as against displacement by the driving thrust by the thrust bearing ring 26; the latter, in turn, being secured by the split locking ring 27, the parts of which are seated in an annular groove 28 in the box hub 20 and secured together by bolts 29.

Gear 24 is driven by pinion 30 (see Fig. 4) which is fast on the drive-shaft 11. The shaft is mounted in a split bearing 31, 31a, which is secured at each end between the box 14 and the box cap 14a, a take-up wedge 32 being provided between said cap and the bearing member 31. The degree of wear is indicated by the bolt 33 extending through slot 34, and the adjustment for wear is accomplished by bolts 35. A collar 36, fast on the shaft 11, bearing on the ring 37, prevents endwise displacement of the shaft under driving pressure of the bevelled gears. Suitable oil-tight and dust-proof caps 38 and 39 cooperate with the housing 19 and box cap 14a to form a complete protective enclosure for the moving parts, bolts 40 and 41 being provided to secure all three caps in place, and packing rings 42, 43 being provided to prevent loss of oil around the shaft 11 or the pinion 30, respectively.

At the rear or inner side of the housing 19 is an annular cover member 44, which cooperates with the groove 45 of the universal driving ring 46 to substantially close the rear of the housing and to retain a bath of oil in the bottom of chamber 23, the approximate oil level being indicated by the line X in Fig. 3. A suitable filling plug 47 may be provided for renewal or replenishment of the lubricant, and a level-indicating plug 47a.

The driving ring 46, as shown in Figs. 3 to 7 inclusive, is provided on its outer face with a pair of diametrically opposite slots or sockets 48 adapted slidably to engage a complementary pair of lugs 49 located on the inner side of the gear 24 (see Fig. 4). On the inner face of the ring is a pair of lugs 50 positioned diametrically opposite each other on a diameter of the ring located 90° from the said sockets 48. Each of these lugs 50 is slidably engaged between the paralleled surfaces 51 of the two adjacent spokes 52 of the wheel 10, the engaging surfaces being equipped, if desirable, with anti-friction pads or inserts 53 (as indicated in Fig. 4).

A system of lubricant passages and slots: 54 and 55 for the bearings of shaft 11; 56 and 57 for the upper and lower surfaces of journal bearing 22; 58, 59 and 60 for bushing 25; and 61, 62 for the lugs 50 and driving surfaces 51; is provided, all being fed by the oil carried upwards by gear 24. The pinion 30, of course, is directly lubricated by contact with the gear; while the lugs 49 and the surfaces of the slots 48 are lubricated by dipping in the oil bath at the bottom of chamber 23 as the gear rotates therein.

In the modification illustrated in Figs. 8 and 9, the major operating parts are similar and are similarly numbered, but I have here obtained a structure of greater compactness, rigidity and simplicity, as well as further simplified the truck structure, by forming the housing 19a integral with the truck frame members 2b and 3b, these parts preferably being a one-piece steel casting. The cover elements or cap-pieces 38a, 39a and 14b are here formed in one piece to conform to the casting of the main casing 19a as a unit with the truck frame members, the entire construction thereby being eminently suited for application to a cast steel truck structure, as distinguished from the usual built-up truck.

I have also simplified the bearing supports for gear 24 by providing a flanged bushing 25a in place of the flange and ring 25 and 26 of Figs. 3 and 4. The driving ring 46a is made of somewhat different form, to fit in properly with the change in arrangement and positioning of the associated parts, but the co-active driving lugs and recesses operate in the same manner as in the other construction. It will also be observed that in place of the thrust bearing 37 for shaft 11 I have provided a bearing 37a located adjacent the pinion 30 and co-operating directly with the right-hand end (in Fig. 9) of the solid one-piece cover structure.

It will now clearly appear that I have provided a geared truck structure which eliminates difficulties previously encountered, ensures the same definite and positive alignment of the driving gears when the truck parts are worn as when they are new and compensates for movements of the axles in any direction or plane whether due to truck conditions or external conditions; and that I have attained these objects by a simple and reliable combination of a flexible driving device or oldham coupling with the gears, axle-box and wheels of the ordinary truck.

It will further be obvious that, in providing such a mechanism I have so co-ordinated the several parts as to provide automatic lubrication of all of them; that they are also so arranged as to make a very compact group around the axle journal and to be capable either of ready application to a built-up truck structure or of application to a unitary cast side frame by forming the combined box and housing integral with said frame. It should also be observed that the box casting itself serves several purposes in addition to the ordinary purpose of transmitting the weight to the bearing, i. e. it provides a bearing for the ring gear, a housing for the parts, a support for the drive-shaft bearing, a reservoir for the oil, and a brace between upper and lower frame members. In case of derailment of the truck, contact of the driving mechanism with the rail, and consequent damage, will be obviated by the guard lugs 10a and the bottom of housing 19.

In actual operation, of this truck, even though journal bearing 22 be substantially worn, thus raising the center of the axle above the centre of the drive-shaft, there is no change in the relation between the pinion and gear, and although the wheel becomes eccentric with the gear the driving ring automatically adjusts itself to the proper driving conditions and continues to transmit the power from the gear to the wheel without any change in the angular velocity.

What I claim is:

1. In apparatus of the character described, a common box structure, for a plurality of axles, having longitudinally spaced-apart drive-shaft supports and means in substantially fixed relation thereto for mounting a driven gear.

2. In a railway vehicle, axles and wheels, a supporting frame, a rigidly interconnected set of axle boxes at one side of the frame, in which said axles are rockingly journalled, and driving means for the axles supported substantially rigidly with said set of boxes, together with a flexible connection interposed between said driving means and each of said axles.

3. In apparatus of the character described, an axle, a weight-carrying axle-box, annular bearing means supported by the box and encircling the axle for carrying a driving gear.

4. In apparatus of the character described, an axle-box having on its outside a bearing for an axle-driving member, encircling the axle, and on its inside a weight-carrying bearing for the axle.

5. In apparatus of the character described, a weight-carrying axle-box carrying annular bearing means for a driving gear, encircling the axle, and provided with an extension housing said gear.

6. In apparatus of the character described, a weight-carrying axle-box formed with an inner annular member to receive a journal and to support a ring-gear and with an outer annular member to house the gear.

7. In a railway vehicle truck having an axle, journal boxes and wheels, driving mechanism including a drive-shaft carrying a pinion, a gear meshing with the pinion, and a flexible connection between the gear and a wheel, said gear having a rotative mounting on one of said boxes.

8. In a railway vehicle truck having an axle, journal boxes and wheels, driving mechanism including a drive-shaft carrying a pinion, a gear meshing with the pinion, and a flexible connection between the gear and a wheel, said drive-shaft having a bearing secured to the adjacent box.

9. In a railway vehicle truck having an axle, journal boxes and wheels, driving mechanism including a drive-shaft carrying a pinion, a gear meshing with the pinion, and a flexible connection between the gear and a wheel, said drive-shaft having a bearing secured to the adjacent box, and said gear having a rotative mounting on the box with means retaining it in fixed alignment with respect to its driving pinion.

10. In a railway vehicle truck having an axle, journal boxes and wheels, driving mechanism lying outside the plane of the wheels including a drive-shaft carrying a pinion, a gear meshing with the pinion, and a flexible connection between the gear and a wheel, said boxes and driving mechanism being arranged to cooperate with the axle to be supported by and to drive the same, at the outer side of the wheels.

11. In a geared locomotive truck, journal boxes transmitting weight to the axles outside the plane of the wheels, and driving means lying outside the plane of the wheels including meshed gears and an oldham coupling between a gear and a wheel of the truck.

12. In a geared locomotive truck, journal boxes transmitting weight to the axles outside the plane of the wheels, and driving means lying outside the plane of the wheels including meshed bevel gears mounted on the truck in fixed relation each to each, and flexible coupling means between a gear and the running-gear of the truck.

13. In a geared locomotive truck, journal boxes transmitting weight to the axles outside the plane of the wheels, and driving means lying outside the plane of the wheels including meshed bevel gears mounted on the truck in fixed relation each to each, and flexible coupling means between a gear and the running-gear of the truck, providing relative sliding movement.

14. In a geared locomotive truck, journal boxes transmitting weight to the axles outside the plane of the wheels, and driving means lying outside the plane of the wheels including meshed bevel gears mounted on the truck in fixed relation each to each, and flexible coupling means between a gear and the running-gear of the truck, providing relative sliding movement in a plurality of planes.

15. A geared truck mechanism including a plurality of wheeled axles, a common drive-shaft therefor mounted longitudinally on the truck outside the plane of the wheels, and a flexible driving connection between each axle and said shaft.

16. A geared truck mechanism including a plurality of wheeled axles, a common drive-shaft therefor mounted longitudinally on the truck outside the plane of the wheels, and a driving connection between each axle and the shaft comprising meshed gears and a flexible coupling.

17. A geared truck mechanism including a plurality of wheeled axles, a common drive-shaft therefor mounted longitudinally on the truck outside the plane of the wheels, and a driving connection between each axle and the shaft comprising meshed gears and a flexible coupling connecting a gear to a wheel of the axle.

18. A geared truck mechanism including, with a wheel and axle thereof, a bearing box for the axle, driving and driven gears supported by means of said box, and a flexible coupling between the driven gear and said wheel.

19. A geared truck mechanism including, with a wheel and axle thereof, a bearing box for the axle, driving and driven gears supported by means of said box, and a universal driving ring between the driven gear and said wheel, said box having a housing enclosing said gears.

20. In a railway vehicle with axles and wheels, a common box member for a plurality of axles, driving means mounted on said member, journal bearings mounted on said member, and flexible connections interposed between the driving means and the wheels.

21. In a railway vehicle, axles and wheels, a common box structure housing two axle journals, said axles being rockingly journalled therein, a drive-shaft, a support for said shaft on said structure, driving gearing, and a support for said gearing on said structure.

22. In a railway vehicle, axles and wheels, a common box structure housing two axle journals, said axles being rockingly journalled therein, a drive-shaft, a support for said shaft on said structure, driving gearing, and a support for said gearing on said structure mounted in fixed relation to said shaft.

23. In a railway vehicle, axles and wheels, a common box structure housing two axle journals, said axles being rockingly journalled therein, a drive-shaft, a support for said shaft on said structure, driving gearing, and a support for said gearing on said structure mounted in fixed relation to said shaft, together with flexible means of connection interposed between a gear and an axle.

24. In a railway vehicle, axles and wheels, a common box structure housing two axle journals, said axles being rockingly journalled therein, a drive-shaft, a support for said shaft on said structure, driving gearing, and a support for said gearing on said structure mounted in fixed relation to said shaft, together with flexible means of connection interposed between a gear and an axle and providing allowance for rocking movement of the axle journal.

25. A geared truck mechanism including a plurality of wheeled axles, a common drive-shaft therefor mounted on the truck, and a driving connection between each axle and the shaft comprising meshed bevel gears in constant alignment and an oldham coupling between a gear and a wheel of the axle, so that uniform mesh and uniform drive are always assured, regardless of axle movement or relative movements between axles.

26. A geared truck mechanism including, with a wheel and axle thereof, driving and driven gears supported in fixed alignment outside the plane of the wheels, and a universal driving ring having a slip connection with a driven gear and a slip connection with the wheel, together with an outside journal box transmitting load to said axle adjacent said driving connection.

27. A geared truck mechanism including, with a wheel and axle thereof, driving and driven gears supported in fixed alignment outside the plane of the wheels, and a universal driving ring having a slip connection with a driven gear and a slip connection with the wheel in a plane at right angles to the slip connection with the gear, together with an outside journal box transmitting load to said axle adjacent said driving connection.

28. A geared truck mechanism including, with a wheel and axle thereof, driving and driven gears supported in fixed alignment, and a universal driving ring having a slip connection with a driven gear and a slip connection with the wheel, said connections including co-operating lugs and recesses on the respective parts, together with an outside journal box transmitting load to said axle adjacent said driving connection.

29. A geared truck mechanism including, with a wheel and axle thereof, driving and driven gears supported in fixed alignment, and a universal driving ring having a slip connection with a driven gear and a slip connection with the wheel, said connections including a pair of diametrically opposite lugs on one side of said ring and a similarly disposed pair of recesses on the other side thereof, set 90° apart, together with an outside journal box transmitting load to said axle adjacent said driving connection.

30. In combination with a truck frame structure, driving parts for the truck, an axle-box formed with an inner annular member for weight bearing purposes and with an outer shell to house said parts, said shell having means for attachment to the frame.

31. In combination with a truck frame structure, driving parts for the truck, an axle-box formed with an inner annular member for bearing purposes and with an outer shell to house the parts, said shell being positioned as a brace between frame parts.

32. In combination with a truck frame structure, driving parts for the truck, an axle-box formed with an inner annular member for bearing purposes and with an outer shell to house the parts, said shell being formed integral with the frame structure.

33. In combination with a wheel and axle journal of a geared truck, a drive-shaft with its pinion, a journal box carrying a shaft bearing and housing the journal bearing, an annular bearing on said box with a driven gear mounted thereon, and a driving ring having sliding lug-and-slot engagement with said gear and wheel.

34. In combination with a wheel and axle journal of a geared truck, a drive-shaft with its pinion, a journal box carrying a shaft bearing and housing the journal bearing, an annular bearing on said box with a driven gear mounted thereon, and a driving ring having sliding lug-and-slot engagement with said gear and wheel, together with gravity oil-delivery means for said parts, and an oil reservoir from which said gear, in revolving, feeds oil to said delivery means.

35. In apparatus of the character described, a weight-carrying axle-box carrying annular bearing means, encircling the axle, for a driving gear, and provided with a combined housing for the gear and reservoir for a lubricant.

36. A geared truck mechanism including, with a wheel and axle thereof, a bearing box for the axle, driving and driven gears supported by means of said box, and a universal driving ring between the driven gear and said wheel, said box having a housing enclosing said gears with an extension thereof co-operating with said driving ring to form, in toto, an oil reservoir.

37. A geared truck mechanism including, with a wheel and axle thereof, a bearing box for the axle, driving and driven gears supported by means of said box, and a universal driving ring between the driven gear and said wheel, said box having a housing enclosing said gears and forming an oil reservoir.

38. A geared truck mechanism including, with a wheel and axle thereof, a bearing box for the axle, driving and driven gears supported by means of said box, and a universal driving ring between the driven gear and said wheel, said box having a housing enclosing said gears and forming an oil reservoir, together with bushing means supporting the driven gear for rotation on said box.

39. A geared truck mechanism including, with a wheel and axle thereof, a bearing box for the axle, driving and driven gears supported by means of said box, and a universal driving ring between the driven gear and said wheel, said box having a housing enclosing said gears and forming an oil reservoir, together with bushing means supporting and retaining the driven gear in rotative position on said box.

40. A geared truck mechanism including, with a wheel and axle thereof, a bearing box for the axle, driving and driven gears supported by means of said box, and a universal driving ring between the driven gear and said wheel, said box having a housing enclosing said gears and forming an oil reservoir, together with bushing means supporting the driven gear for rotation on said box, and means whereby said gear lubricates its bushing from said reservoir.

41. A geared locomotive mechanism, including, with an axle thereof and its wheels, driving mechanism for said axle and wheels including gearing and a flexible joint device between the gearing and the axle and wheels. and a construction, commonly serving to journal the axle and to support the driving mechanism, including a casing co-operating with the driving mechanism to form an oil reservoir and arranged to permit the flexing of the joint device.

42. In a device of the character described, a wheel with a journalled axle, a box housing the journal and supporting a gear, a shell forming an oil reservoir and housing for the gear, and a universal driving ring having flexible connection to the wheel and gear, a portion of said ring being located within the housing and a portion without, with a groove formed intermediate the two to co-operate with the housing and seal the oil reservoir.

43. In a device of the character described, a wheel with a journalled axle, a box housing the journal and supporting a gear, a shell forming an oil reservoir and housing for the gear. and a universal driving ring having flexible connection to the wheel and gear, a portion of said ring being located within the housing and a portion without, the flexible connection to the gear being on the inner portion and dipping in the reservoir during revolving, and the flexible connection to the wheel being on the outer portion and having oil delivery channel means fed by oil carried upward by the ring in revolving.

44. In a truck of the character described, a drive-shaft, a journal box and cap, housing and supporting a drive-shaft bearing, said bearing, and a take-up wedge re-acting against the cap.

45. In a truck of the character described, the combination of a wheel, driving means therefor including a device slip-jointed to the wheel, and guard means on the wheel positioned to prevent contact of said device with a rail in case of derailment of the truck.

46. A geared locomotive mechanism, including, with an axle thereof and its wheels, driving mechanism for said axle and wheels including gearing and a flexible joint device between the gearing and the axle and wheels, and guard means housing the parts and positioned to protect them as against contact with a rail in case of derailment of the locomotive and arranged to permit the flexing of the joint device.

In testimony whereof I have hereunto signed my name.

LEWIS E. FEIGHTNER.